July 6, 1926.
C. H. HAPGOOD ET AL
WEIGHING SCALE
Filed Sept. 2, 1925
1,591,487
2 Sheets-Sheet 1
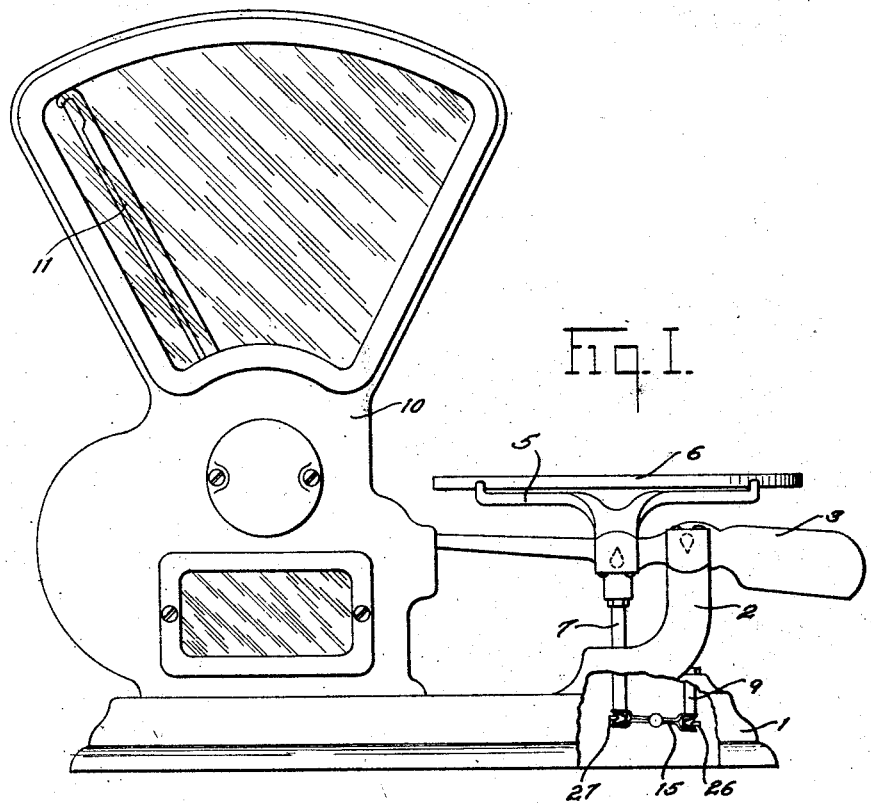
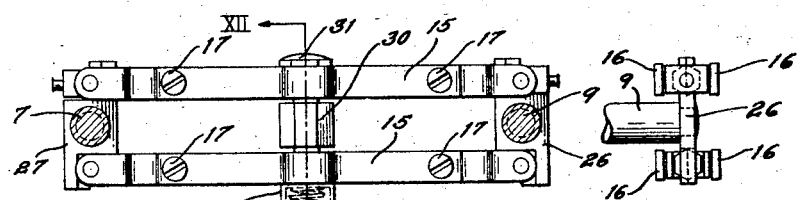
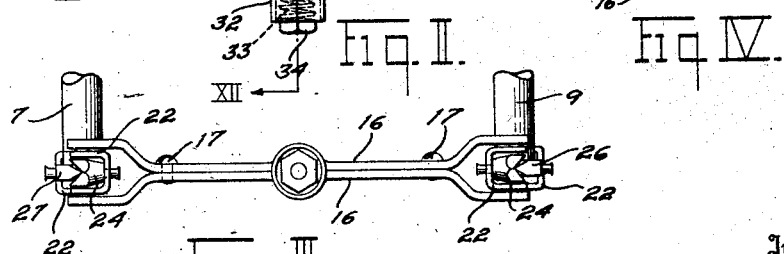
Inventor
Clarence H. Hapgood
William A. Guss
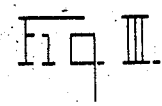
By C.M. Marshall
Attorney July 6, 1926.
C. H. HAPGOOD ET AL
WEIGHING SCALE
Filed Sept. 2, 1925      2 Sheets-Sheet 2
1,591,487
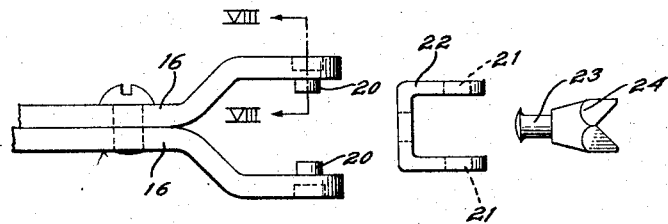
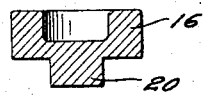
Fig. V.
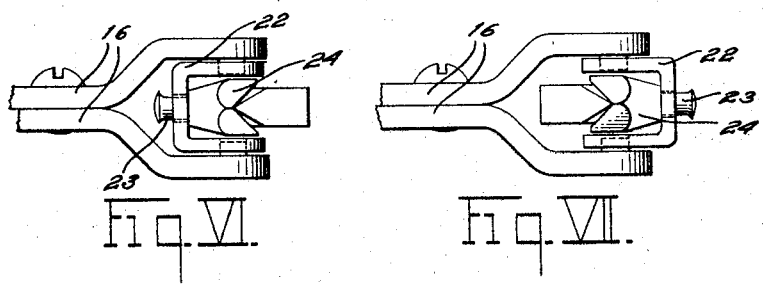
Fig. VI.    Fig. VII.    Fig. VIII.
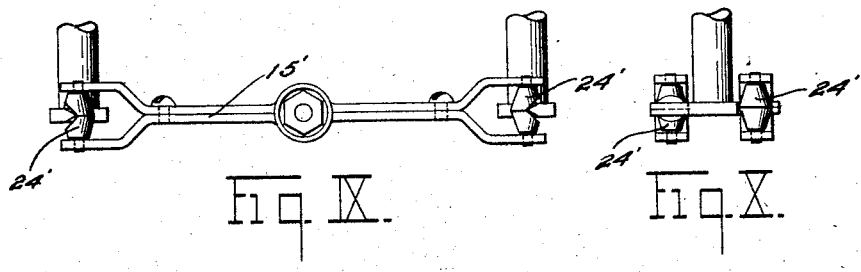
Fig. IX.    Fig. X.
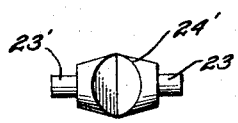
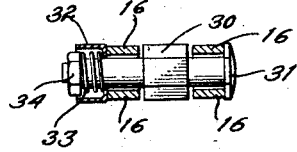
Fig. XI.    Fig. XII.
Inventor
Clarence H. Hapgood.
William A. Guss.
By C. O. Marshall,
Attorney Patented July 6, 1926.

1,591,487

UNITED STATES PATENT OFFICE.

CLARENCE H. HAPGOOD AND WILLIAM A. GUSS, OF TOLEDO, OHIO, ASSIGNORS TO TOLEDO SCALE COMPANY, OF TOLEDO, OHIO, A CORPORATION OF NEW JERSEY.

WEIGHING SCALE.

Application filed September 2, 1925. Serial No. 53,986.

This invention relates to weighing scales, and one of its principal objects is to improve the means employed for stabilizing pivotally mounted members, such as the means for preventing the platform from tilting or tipping when a load is placed adjacent one of its edges.

Another object of this invention is the provision of a stabilizing means for a scale platform employing a checking means which may be either in tension or compression, but in either case a knife edge contact is had between the moving parts so that friction is reduced to a minimum.

Still another object is the provision of a check link mechanism for weighing scales, the check link being provided with adjustable elements adapted to engage knife edges, said elements being capable of adjustment so as to form either a "push" or "pull" connection between the connected parts.

A further object is the provision of a check link for scales having pivotally mounted bearings adapted for engagement with knife edges, said bearings being so constructed as to automatically adjust themselves to perfect aligning engagement with said knife edges.

Still another object is the provision of a device of this character which may be economically manufactured and readily assembled in the scale and which may be easily and accurately adjusted without the use of special tools.

Other objects and advantages will be apparent from the following description, in which reference is had to the accompanying drawings illustrating preferred embodiments of the invention and wherein similar reference numerals designate similar parts throughout the several views.

Figure I is an elevational view of a weighing scale embodying the invention;

Figure II is a top plan view of the link of the invention;

Figure III is an elevational view of the link illustrated in Figure II;

Figure IV is an end elevational view of the link assembly;

Figure V is an enlarged disassembled view of the elements forming one end of the check link of the invention;

Figure VI is an enlarged fragmentary elevational view of an assembly of one end of a link showing the bearing in engagement with a knife edge member so as to form a "pull" connection;

Figure VII is a fragmentary view similar to Figure VI showing the bearing and associated parts in engagement with a knife edge member so as to form a "push" connection.

Figure VIII is an enlarged sectional view showing an element of the invention taken substantially on the line VIII—VIII of Figure V;

Figure IX is a fragmentary view similar to Figure III showing the modified form of the invention;

Figure X is an end elevational view of the link assembly illustrated in Figure IX;

Figure XI is an enlarged detail view of one of the bearings forming a part of this invention; and Figure XII is a detail sectional view taken substantially on the line XII—XII of Figure II.

Referring to the drawings in detail, we have illustrated the invention as incorporated in a counter scale of the fan type, but it is to be understood that we contemplate the use of the invention wherever it may be found applicable, the scale per se forming no part of the present invention. The scale comprises a substantially hollow base 1, one end thereof being provided with integral upwardly projecting fulcrum stands 2 which support the main lever 3 of the scale. The lever 3 is also provided with load pivots which support a spider 5, the latter surmounted by a platform or commodity-receiver 6.

The nose end of the lever projects into a housing 10 erected upon one end of the base 1 and is operatively connected to some form of load-counterbalancing mechanism (not shown), the latter being provided with an indicator hand 11 which is adapted to cooperate with a chart located in the fan shaped upper portion of the housing 10 to indicate weights of loads upon the platform 6.

The improved platform stabilizing mechanism forming the principal object of this invention will now be described. The platform supporting spider 5 is provided with a depending stem 7, to the lower end of which is secured a knife edge member 27 which is pivotally connected to a similar knife edge member secured to the lower end of a rod 9 adjustably secured to the base 1. The check link or stabilizing means connecting these knife edge members comprises a pair of substantially parallel members 15, each member being formed of a pair of bars 16 fixedly secured together by means of screws 17, the ends of the bars 16 projecting laterally in opposite directions so as to form yokes or furcations. The inner walls of the furcations are formed with projecting studs 20, as better illustrated in Figures V and VIII, which are adapted to be received into openings 21 in the furcations of a U-shaped member 22 when the ends of the bars 16 are sprung outwardly to admit the U-shaped member. The bight of the member 22 is bored to loosely receive the tenon 23 of a V-grooved bearing member 24. After assembly of the parts, as shown in Figures VI and VII, the end of the tenon 23 is swaged at the end to prevent a derangement of the parts. When the bearing is in the position illustrated in Figure VI the V-grooved bearing 24 is adapted to engage the knife edge of the member 26 secured to the post 9 to form a "pull" connection. By simply rotating the U-shaped member 22 through 180° to the position illustrated in Figure VII the bearing 24 is adapted to engage the other knife edge of the member 15 to form a "push" connection. The other ends of the links 15 are provided with similar bearings which engage the knife edges of the member 27 fixed to the extremity of the spider stem 7, as better illustrated in Figure II, and forms a very efficient "push" and "pull" connection between the spider stem 7 and the fixed post 9. Any tendency of the commodity-receiving platform to tip when loads are placed adjacent the edges thereof will be prevented because of the check links 15. It will also be apparent that the knife edges of the members 26 and 27 will be in aligned engagement with the bearings 24 throughout the weighing movements of the commodity-receiver 6 because of the method of mounting the bearings in the links 15.

The links 15 are secured together intermediate their ends by means of a stud 30, one end of which is provided with a head 31, the other end adapted to receive a cup-like member 32 which houses an expansive coil spring 33, the latter being retained in place by means of a nut 34 threaded upon the stud 30, the spring 33 serving to resiliently retain the bearings in proper engagement with their respective knife edges.

In the modified form of the invention illustrated in Figures IX to XI the links 15' are provided at their bifurcated ends with openings adapted to loosely receive tenons 23' on either end of bearings 24'. These bearings are formed with enlarged center portions and are provided with V-shaped grooves, the apices of the grooves passing through the longitudinal axes of the bearings. It will be apparent that with such construction the bearings may be rotated through an angle of 180° without increasing or diminishing the distance between the apices of the V-grooves of the bearings secured to the ends of each link 15'. In this manner it is possible to utilize one style of bearing to form both "push" and "pull" connections, as it is only necessary to rotate the bearings through 180° to adapt them for use with oppositely projecting knife edges.

The embodiments of the invention herein shown and described are to be regarded as illustrative only, and it is to be understood that the invention is susceptible to variation, modification and change within the spirit and scope of the subjoined claims.

Having described our invention, we claim:

1. In a device of the class described, in combination, weighing mechanism having relatively movable elements, means pivotally connecting said elements comprising a link, knife edge members secured to said elements, and bearings secured to said link and relatively movable thereto and adapted for engagement with said knife edge members to form a pivotal joint.

2. In a device of the class described, in combination, weighing mechanism having relatively movable elements, knife edge members secured to said elements, means for pivotally connecting said elements comprising a link, bearings secured to said link and adapted to engage the knife edges of said members, and means whereby said bearings may be adjusted relatively to said link to form a "push" or "pull" connection between said relatively movable elements.

3. In a device of the class described, in combination, weighing mechanism having relatively movable elements, knife edge members secured to said elements, means for pivotally connecting said elements comprising a link, bearings secured to said link and adapted to engage the knife edges of said members, means for maintaining said links in proper relation relative to each other, and means whereby said bearings may be adjusted relatively to said link to form a "push" or "pull" connection between said relatively movable elements.

4. In a device of the class described, in combination, a frame, weighing mechanism including a lever supported upon said frame, a commodity-receiver supported upon said lever, an arm projecting from said commodity-receiver, and means connecting said arm and said frame for stabilizing said commodity-receiver, said means including a link having bearings relatively movable with respect to said link and adapted to engage knife edges fixed to said arm and the frame.

5. In a device of the class described, in combination, a pair of relatively movable members, a pair of links each comprising a plurality of bars secured together and separated at the ends, V-grooved bearings pivotally secured to the separated ends of said bars, knife edge members secured to said relatively movable members, said bearings adapted to engage and align themselves with said knife edges to form a "push" and "pull" connection.

6. A pivotal connection comprising a pair of relatively movable members, knife edges on said members, a pair of links, and bearing pieces pivotally connected to said links and adapted to engage said knife edges to form a "push" and "pull" connection therebetween.

7. A pivotal connection comprising a pair of relatively movable members, knife edges on said members, a pair of links, and bearing pieces secured to said links and being relatively movable with respect thereto, said bearing pieces adapted to engage and properly align themselves with said knife edges to form a "push" and "pull" connection between said relatively movable members.

8. A pivotal connection comprising a pair of relatively movable members, knife edges on said members, a pair of links, bearing pieces secured to said links and being relatively movable with respect thereto, said bearing pieces adapted to engage and properly align themselves with said knife edges to form a "push" and "pull" connection between said relatively movable members, and means for resiliently retaining said links in proper relation relative to each other.

9. A pivotal connection comprising a fixed member, a movable member, oppositely disposed longitudinally aligned knife edges secured to said members, a pair of links, U-shaped members pivotally secured to said links, and bearing pieces pivotally secured to said U-shaped members and adapted to engage said knife edges to form a "push" and "pull" connection.

10. A pivotal connection comprising relatively movable members, means connecting said members including a plurality of links, bearing pieces pivotally secured to said links, and knife edges on said members adapted to be engaged by said bearings, said bearings being capable of adjustment to form "push" or "pull" connections.

11. In a pivotal joint, a fixed member, a movable member, each of said members having oppositely disposed aligned knife edges, a link, bearing pieces pivotally secured to said link, said bearing pieces engaging the knife edges of the fixed and movable members and being capable of adjustment to form "push" or "pull" connections between said fixed and movable members.

CLARENCE H. HAPGOOD.
WILLIAM A. GUSS.